United States Patent
Tschudin et al.

(10) Patent No.: US 12,085,429 B2
(45) Date of Patent: *Sep. 10, 2024

(54) MAGNETIC-INDUCTIVE FLOW METER AND METHOD FOR OPERATING A MAGNETIC-INDUCTIVE FLOW METER

(71) Applicant: ENDRESS+HAUSER FLOWTEC AG, Reinach (CH)

(72) Inventors: Beat Tschudin, Reinach (CH); Simon Mariager, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 274 days.

This patent is subject to a terminal disclaimer.

(21) Appl. No.: 17/638,504

(22) PCT Filed: Aug. 3, 2020

(86) PCT No.: PCT/EP2020/071816
§ 371 (c)(1),
(2) Date: Feb. 25, 2022

(87) PCT Pub. No.: WO2021/037491
PCT Pub. Date: Mar. 4, 2021

(65) Prior Publication Data
US 2022/0404185 A1 Dec. 22, 2022

(30) Foreign Application Priority Data
Aug. 30, 2019 (DE) .......................... 102019123359.3

(51) Int. Cl.
*G01F 1/58* (2006.01)
*G01F 1/60* (2006.01)
*G01N 11/00* (2006.01)

(52) U.S. Cl.
CPC ................ *G01F 1/588* (2013.01); *G01F 1/60* (2013.01); *G01N 11/00* (2013.01)

(58) Field of Classification Search
CPC ........... G01F 1/588; G01F 1/584; G01F 1/60; G01N 11/00
See application file for complete search history.

(56) References Cited

U.S. PATENT DOCUMENTS

| 4,459,858 A | 7/1984 | Marsh |
| 6,094,992 A | 8/2000 | Mesch et al. |

(Continued)

FOREIGN PATENT DOCUMENTS

| DE | 102007063372 A1 | 7/2009 |
| EP | 0892251 A1 | 1/1999 |
| JP | 6175217 B2 | 8/2017 |

*Primary Examiner* — Suman K Nath
(74) *Attorney, Agent, or Firm* — Christopher R. Powers; Endress+Hauser (USA) Holding, Inc.

(57) ABSTRACT

A magnetic-inductive flow meter includes: a housing; a first and a second measurement electrode in galvanic contact with a flowing medium in a pipe; a magnetic field-generating device positioned in the housing and including a measurement circuit configured to determine a first measurement variable, and wherein measurement values of the first measurement variable are measured between two measurement electrodes or at a measurement electrode in relation to a reference potential; and an evaluation circuit configured to determine a Reynolds number and/or a kinematic viscosity value of the medium using measurement values of the first measurement variable and of a second measurement variable, which differs from the first measurement variable, wherein the measurement electrodes are positioned such that, during a test measurement, quotients of current measurement values of the first and of the second measurement variable correspond bijectively with the Reynolds number of the medium in the pipe.

21 Claims, 6 Drawing Sheets

(56) References Cited

U.S. PATENT DOCUMENTS

| | | |
|---|---|---|
| 2008/0127712 A1 | 6/2008 | Baker |
| 2016/0238422 A1 | 8/2016 | Wee et al. |
| 2018/0372523 A1* | 12/2018 | Alkhabbaz ................ G01F 1/24 |
| 2021/0164814 A1* | 6/2021 | Mariager ................ G01F 1/584 |
| 2021/0364331 A1* | 11/2021 | Mariager ................ G01F 1/584 |

* cited by examiner

Fig.1

PRIOR ART

PRIOR ART

MAGNETIC-INDUCTIVE FLOW METER AND METHOD FOR OPERATING A MAGNETIC-INDUCTIVE FLOW METER

CROSS-REFERENCE TO RELATED APPLICATIONS

The present application is related to and claims the priority benefit of German Patent Application No. 10 2019 123 359.3, filed on Aug. 30, 2019, and International Patent Application No. PCT/EP/2020/071816, filed Aug. 3, 2020, the entire contents of which are incorporated herein by reference.

TECHNICAL FIELD

The present disclosure relates to magnetic-inductive flow meters, in particular, to configurations of measurement electrodes of magnetic-inductive flow meters, and to methods for operating such magnetic-inductive flow meters.

BACKGROUND

Magnetic-inductive flow-measuring devices are used for determining the flow rate and the volumetric flow of a flowing medium in a pipeline. A magnetic-inductive flow-measuring device has a magnet system that generates a magnetic field perpendicular to the direction of flow of the flowing medium. Single coils are typically used for this purpose. In order to realize a predominantly homogeneous magnetic field, pole shoes are additionally formed and attached such that the magnetic field lines run over the entire pipe cross-section substantially perpendicularly to the transverse axis or in parallel to the vertical axis of the measuring pipe. A measurement electrode pair attached to the lateral surface of the measuring pipe taps an electrical measurement voltage or potential difference which is applied perpendicularly to the direction of flow and to the magnetic field and occurs when a conductive medium flows in the direction of flow when the magnetic field is applied. Since, according to Faraday's law of induction, the tapped measurement voltage depends on the velocity of the flowing medium, the flow rate u and, with the aid of a known pipe cross-section, the volumetric flow V can be determined from the induced measurement voltage U.

In contrast to a magnetic-inductive flow-measuring device, magnetic-inductive flow meters with their usually circular cylindrical housing are inserted into a lateral opening of a pipeline and fixed in a fluid-tight manner. A special measuring pipe is no longer necessary. The mentioned coil arrangement on the lateral surface of the measuring pipe is dispensed with since the magnetic field only exists in the region of the front end of the flow meter projecting into the fluid or is generated by a current flowing through its coil arrangement in this region. For this purpose, the magnet system is usually arranged inside the housing and in close proximity to the measurement electrodes so that an axis of symmetry of the generated magnetic field lines perpendicularly intersects the face between the measurement electrodes. The measurement electrodes are arranged either on the front face or on the side faces of the housing.

For both measuring systems, the measurement voltage U applied to the measurement electrodes is composed of the simplified equation $$U = f(Re) \cdot u \cdot S$$

wherein S is a nominal signal strength dependent on the sensor geometry and the magnetic field, and $f(Re)$ is a flow profile-dependent or Reynolds number-dependent correction factor. The correction factor $f$ (Re) is usually assumed to be constant. However, this is not always the case. The nominal signal strength S is determined during the calibration of the flow meter, and its value is stored in a memory of the evaluation circuit.

The Reynolds number of a flowing medium in a pipeline is defined by $$Re = \rho \cdot u \cdot \frac{DN}{\mu} = u \cdot \frac{DN}{v},$$

with the diameter DN of the pipeline, the density of the medium $\rho$, the dynamic viscosity $\mu$, and the kinematic viscosity v of the medium.

Magnetic-inductive flow meters are particularly sensitive to the present Reynolds number of the medium in the pipeline since this determines the flow profile of the flowing medium. Depending on the pipe system, magnet system, and installation depth, the correction factor $f(Re)$ can vary and deviate from the assumed constant value by several percent. Usually, the arrangement of the measurement electrodes and the magnetic field-generating device is optimized in such a way that the characteristic curve of the flow meter is as linear as possible, i.e., the induced measurement voltage is independent of a Reynolds number over as large a Reynolds number range as possible or for the Reynolds number range of interest for the specific application and a predetermined installation depth. Thus, flow meters which have a deviation of a few percent in transition flow regions and flow meters which have deviations of approximately 2 to 5% for flows with a turbulent flow profile are already industry standards.

EP 0 892 251 A1 discloses a magnetic-inductive flow meter, whose front end projecting into the fluid takes the form of a spherical cap and in which a first and a second electrode for forming a galvanic contact are arranged on one of the meridians of the spherical cap symmetrically to an apex of the meridian. The spherical cap shape reduces the formation of flow vortices which occur when the medium flows against the front region of the flow meters, and the measuring accuracy increases at low flow velocities.

So far, however, neither a magnetic-inductive flow meter nor a method for operating a magnetic-inductive flow meter which determines the Reynolds number of the medium and, starting therefrom, corrects the flow value is known.

SUMMARY

The object of the invention is to remedy this. The object is achieved by the magnetic-inductive flow meter, by the method for operating the magnetic-inductive flow meter and by the flow measuring point according to the present disclosure.

The magnetic-inductive flow meter according to the invention, which can be inserted into a pipe through which a medium flows, comprises:
a housing, wherein the housing has a housing wall;
at least a first and a second measurement electrode, which are arranged on the housing wall, each for forming a galvanic contact with a flowing medium;
at least one magnetic field-generating device for generating a magnetic field passing through the housing wall, wherein the magnetic field-generating device is arranged in the housing; and a measurement circuit configured to determine at least a first measurement variable, wherein measurement values of the first measurement variable are measured between two measurement electrodes or at a measurement electrode in relation to a reference potential, especially, a ground potential, and is characterized in that an evaluation circuit is configured to determine a Reynolds number and/or a kinematic viscosity value of the medium in the pipe by means of measurement values of the first and a second measurement variable that differs from the first measurement variable, wherein measurement values of the second measurement variable are determined between two measurement electrodes or at one measurement electrode in relation to a reference potential, especially, a ground potential, wherein at least one measurement electrode configured to determine the measurement values of the second measurement variable differs from the measurement electrodes configured to determine the measurement values of the first measurement variable.

It is particularly advantageous if the magnetic-inductive flow meter has an evaluation circuit which is configured to determine the Reynolds number and/or the kinematic viscosity, which depends on the Reynolds number, of the medium in the pipeline by means of measurement values of two measurement variables tapped at at least two measurement electrodes. The first measurement variable differs from the second measurement variable. The two measurement variables differ in that they are determined between different measurement electrode pairs or are measured at different measurement electrodes.

Measurement circuits in the field of flow measurement technology are sufficiently known. The object of the measurement circuit is to detect very small absolute values and changes in the respective measurement variable. There is a plurality of different embodiments, each having its advantages and disadvantages.

On the one hand, the measurement circuit may be configured to tap a potential at one of the measurement electrodes in relation to a reference potential. Thus, even if one of the two measurement electrodes fails, the flow rate can still be determined on the basis of a determined potential. The housing potential or a ground potential is suitable as the reference potential. The magnetic-inductive flow meter may have a grounding electrode connected to the reference potential. The two measurement variables can accordingly be the electrical potentials prevailing and determined at each of two measurement electrodes.

On the other hand, the measurement circuit may be designed to detect and record a potential difference prevailing between two measurement electrodes.

Alternatively, the measurement circuit may be configured to measure the measurement voltage between the first and the second measurement electrode and, in addition, to measure the potential at one of the two or a third measurement electrode in relation to the reference potential.

A measurement circuit therefore comprises an analog/digital converter which converts the incoming signals, in this case the potential difference currently present at the respective measurement electrode pair or the electrical potential prevailing at the respective measurement electrode, into digital data, which are then further processed or stored by an evaluation circuit. However, other measuring converters or measuring transducers from the field of digital measurement technology are also known and suitable for detecting a measurement voltage or an electrical potential.

The evaluation circuit is configured to process the measurement values of the respective measurement variables measured by the measurement circuit and to determine the measurement variable sought. An evaluation circuit therefore usually comprises microprocessors, amplifiers, and noise filters. The measurement and evaluation circuit can be of modular design, and can communicate by means of a wireless connection, or can be part of a single electronic measurement and evaluation unit, which is arranged in a housing of the flow meter.

The method according to the invention for operating a magnetic-inductive flow meter, especially, the magnetic-inductive flow meter according to the invention, wherein the flow meter has a housing with a housing wall, wherein a magnetic field-generating device for generating a magnetic field passing through the housing wall is arranged in the housing, wherein measurement electrodes are arranged on the housing wall; comprises the method steps:

detecting a measurement value of a first measurement variable and a measurement value of a second measurement variable that differs from the first measurement variable, wherein the measurement values of the respective measurement variables are determined between two measurement electrodes or at a measurement electrode in relation to a reference potential, especially, a ground potential;

determining a Reynolds number that depends on the first and the second measurement variable.

The measurement values of a single measurement variable are not sufficient to determine the Reynolds number of the medium in the pipeline because the two unknowns, namely the Reynolds number and the flow rate of the medium, cannot be determined by a single measurement variable. For this reason, the entire measuring system is usually configured such that the induced measurement voltage is Reynolds number-independent over as large a Reynolds number range as possible. The information of the present Reynolds number is thereby lost. It is therefore particularly advantageous if the flow meter is configured to determine, in addition to the first measurement variable for determining a flow measurement value, a second measurement variable which is Reynolds number-dependent and to determine the Reynolds number taking into account both measurement variables. In this case, the measuring system does not have to be adapted such that the measured measurement voltages are as Reynolds number-independent as possible, which significantly limits the design of the magnet and measuring systems.

The flow measuring point according to the invention comprises:

a pipeline having a diameter DN and an opening, and a magnetic-inductive flow meter according to the invention;

and is characterized in that the magnetic-inductive flow meter is arranged in the opening and has an installation depth D, which especially satisfies the inequality $0.05 \leq D/DN \leq 0.4$ and preferably $0.1 \leq D/DN \leq 0.2$.

Advantageous embodiments of the invention are the subject matter of the subclaims.

One embodiment provides that the measurement electrodes are arranged on the housing wall such that, during a test measurement, quotients of current measurement values of the first and the second measurement variable bijectively correspond to the Reynolds number of the medium in the pipe, at least in a Reynolds number range of 10,000≤Re≤100,000, especially 5,000≤Re≤500,000 and preferably 1,000≤Re≤1,000,000.

The arrangement of the measurement electrodes on the housing of the flow meter is essential for determining the Reynolds number. In order for the Reynolds number to be able to be determined on the basis of the two measurement variables, the quotients of the measurement values or a mathematical function that describes the quotient of the measurement values of the respective measurement variable as a function of the Reynolds number of the medium in the pipe must be bijective. This is defined by the position of the measurement electrode on the housing.

The position of the measurement electrodes is optimized in such a way that the quotient of the first and second measurement variables, especially, of the first and second measurement voltages $U_1/U_2$, behaves bijectively to the Reynolds number of the flowing medium in the pipe. The optimization can take place experimentally or by means of a simulation method, for example, by means of finite element simulations.

For the quotient $U_1/U_2$, assuming that the flow rate arises from the respectively induced measurement voltage of a common flow rate u, the following results:

$$\frac{U_1}{U_2} = \frac{f_1(Re)}{f_2(Re)} \cdot \frac{S_1}{S_2} = g(Re) \cdot \frac{S_1}{S_2}.$$

In the case that g(Re) is invertible, $$Re = g^{-1}\left(U_1 \cdot \frac{S_2}{S_1 \cdot U_2}\right)$$

also applies, wherein $g^{-1}$ is the inverse function of g. The bijectivity of the quotient can most easily be realized by arranging the first and second measurement electrodes on the housing such that the first correction factor $f_1(Re)$ is independent of the Reynolds number over the Reynolds number range. In this case, the second correction factor $f_2$ must bijectively correspond to the Reynolds number. The position of one of the two measurement electrodes or of a third measurement electrode is therefore ideally selected such that the change in the correction factor $f_2(Re)$, which describes the Reynolds number dependence of the second measurement variable, or the slope of the quotient $U_1/U_2$ is as large as possible for different Reynolds numbers.

However, it is advantageous if at least three measurement electrodes are available for determining the measurement variables. The bijectivity of the quotient can then be realized in that the first and the second measurement electrode are arranged on the housing such that the first correction factor $f_1(Re)$, which is concealed behind the induced measurement voltage, is independent of the Reynolds number over the Reynolds number range. In this case, the second correction factor $f_2$ must bijectively correspond to the Reynolds number. The position of the third measurement electrode is therefore ideally selected such that the change in the correction factor $f_2(Re)$ or the slope of the quotient is as large as possible for different Reynolds numbers. The correction factor $f_2(Re)$ can accordingly be determined by a measurement voltage determined between the first and the third measurement electrode, by a measurement voltage determined between the second and the third measurement electrode, or by the potential determined at the third measurement electrode in relation to the reference potential.

The positioning of the individual measurement electrodes on the housing is decisive for determining the Reynolds number or the kinematic viscosity. Measurement values of two measurement variables are required to determine the Reynolds number. The first measurement variable is determined with the measurement circuit at a measurement electrode pair. The same preferably also applies to the second measurement variable. However, the position of the individual measurement electrodes cannot be selected arbitrarily. It must be true that the quotient of the measurement values of the first and of the second measurement variable bijectively corresponds to the Reynolds number of the flowing medium in the pipe. This means that the quotients of the measurement values of the first and the second measurement variable, measured over a Reynolds number range, can be described by a mathematical function which is bijective to the Reynolds number, or that the set of the quotients of the measurement values bijectively corresponds to the linked set of the Reynolds numbers over a Reynolds number range.

This is realized, for example, by arranging the first measurement electrode pair diametrically on a front face, as is customary in conventional flow meters, and arranging the third measurement electrode or the third and a fourth measurement electrode on the front face or on a side face of the housing at an offset from the first measurement electrode pair.

The measurement values of the first measurement variable are thus substantially Reynolds number-independent and the measurement values of the second measurement variable are Reynolds number-dependent. However, this is not the only possibility of realizing a flow meter according to the invention. It is also conceivable for all measurement electrodes to be arranged such that the measurement values tapped at the measurement electrodes over the Reynolds number range or over a part of the Reynolds number range are Reynolds number-dependent. In this case, however, the quotient of the measurement values must bijectively correspond to the Reynolds number so that the Reynolds number can be determined.

The evaluation circuit usually has a memory unit, wherein the memory unit has a first data set with reference values which correlate with the first and second measurement variables and are especially proportional to the quotient of the first and second measurement variable, wherein the memory unit has a second data set with Reynolds numbers, wherein the first and the second data set bijectively correspond, wherein the evaluation circuit is configured to determine the corresponding Reynolds number of the medium in the pipeline on the basis of the first and second measurement variable.

Non-volatile memory, such as flash memory or EPROM, is suitable as a memory unit. This can be integrated into the evaluation circuit or provided separately. The memory unit preferably has at least a first and a second data set. Reference values are stored in the first data set. These originate from computer simulations or from calibration measurements. The reference values may, for example, be quotients of the simulated or measured measurement values of the first measurement variable and of the second measurement variable. The second data set has Reynolds numbers that are assigned to the quotients. Alternatively, pairs, each consisting of a Reynolds number and a reference value, may be stored in the memory unit. Alternatively, a mathematical function which assigns Reynolds numbers to the two measurement variables or to a term which depends on the two measurement variables can also be stored in the memory unit.

One embodiment provides that the measurement circuit is configured to determine the measurement values of the first measurement variable between the first and the second measurement electrode, wherein the measurement circuit is configured to determine measurement values of the second measurement variable between a first and a third measurement electrode, or between a second and the third measurement electrode.

The measurement circuit is preferably designed in such a way that it determines a first potential difference $U_1$ between a first measurement electrode pair and a second potential difference $U_2$ between a second measurement electrode pair. The measurement voltage is determined either by directly measuring the potential difference between the two measurement electrodes or by measuring the electrical potential prevailing at each of the measurement electrodes in relation to a reference potential and forming a difference. In this case, $U_1 = f_1(Re) \cdot S_1 \cdot u$ and $U_2 = f_2(Re) \cdot S_2 \cdot u$ apply, wherein $f_1(Re)$ and $f_2(Re)$ each describe a Reynolds number-dependent correction factor. The determined measurement values are forwarded to an evaluation circuit, which comprises a memory unit in which reference values and Reynolds numbers are stored or in which a mathematical function which assigns Reynolds numbers to reference values is stored.

It is advantageous if the flow meter has exactly three measurement electrodes. This reduces the number of potential leakage points to three. This embodiment can most easily be realized by expanding a conventional magnetic-inductive flow meter having two measurement electrodes by another measurement electrode. The latter can be arranged on a side face of the housing or on the front face, at an offset from the first and second measurement electrodes.

It is particularly advantageous if the three measurement electrodes are arranged on a straight line running on the end face of the housing, especially, of a diameter of the front face. When the predetermined installation position is maintained, a significantly larger measurement signal is present at the respective measurement electrode pairs in this embodiment than otherwise.

However, if the measurement signal strength plays only a subordinate role, the offset of the third measurement electrode with respect to the straight line intersecting the first and second measurement electrodes results in a further degree of freedom for optimizing the Reynolds number-dependent measurement variable or for the second measurement variable.

One embodiment provides that the measurement circuit is configured to determine the measurement values of the first measurement variable between the first and the second measurement electrode, wherein the measurement circuit is configured to determine measurement values of the second measurement variable between a third and a fourth measurement electrode.

The measurement circuit is preferably designed in such a way that it determines a first potential difference $U_1$ between a first measurement electrode pair and a second potential difference $U_2$ between a second measurement electrode pair. The measurement voltage is determined either by directly measuring the potential difference between the two measurement electrodes or by measuring the electrical potential prevailing at each of the measurement electrodes in relation to a reference potential and forming a difference. In this case, $U_1 = f_1(Re) \cdot S_1 \cdot u$ and $U_2 = f_2(Re) \cdot S_2 \cdot u$ apply, wherein $f_1(Re)$ and $f_2(Re)$ each describe a Reynolds number-dependent correction factor. The determined measurement values are forwarded to an evaluation circuit, which comprises a memory unit in which reference values and Reynolds numbers are stored or in which a mathematical function that assigns Reynolds numbers to reference values is stored.

In order to avoid common mode disturbances and thus minimize the noise in the signal, it is advantageous if the two measurement variables are not potentials in relation to a reference potential but rather potential differences that are measured.

In conventional magnetic-inductive flow meters, the magnet system and the position of the measurement electrodes are optimized in such a way that the electrical potential prevailing at each of the measurement electrodes correlates linearly with the flow rate. If a third measurement electrode is now added and the potential difference between the third and one of the two measurement electrodes is measured, the influence of the linearized measuring system is always included in the second measurement variable. However, the latter should be Reynolds number-dependent over as large a Reynolds number range as possible.

It is therefore particularly advantageous if the measurement values of the second measurement variable are tapped at the third and a fourth measurement electrode, which are arranged at an offset from the first measurement electrode pair. As a result, the potential difference present at the second measurement electrode pair is also decoupled from the two potentials of the first measurement variable.

It is particularly advantageous if the first measurement electrode pair is arranged diametrically or on the front face of the housing.

One embodiment provides that the housing is cylindrical at least in sections and has a lateral surface, wherein the third measurement electrode is arranged on the lateral surface and forms a galvanic contact with the medium.

In this case, the third measurement electrode can be formed by a single pin electrode or extend over the entire lateral surface of the housing or be formed by the conductive lateral body of the housing. By attaching the third measurement electrodes to the lateral surface, further optimization possibilities for the respective Reynolds number-dependent measurement variables open up so that the range in which the quotient of the two measurement variables bijectively corresponds to the Reynolds number can be expanded.

Furthermore, particularly narrow flow meters can be realized by this special arrangement.

One embodiment provides that the first, second and a third measurement electrode are arranged on an end face of the housing.

This is particularly advantageous since a cumbersome sealing of the measurement electrodes on the lateral face of the predominantly cylindrical housing is avoided. Furthermore, the production effort of this special flow meter is considerably lower. For applications in small-diameter pipes, the installation depth is so small that only a minimal proportion of the lateral face touches the medium.

One embodiment provides that the first and the second measurement electrode lie on a circumference that runs on the end face and is arranged coaxially to the housing, wherein the circumference surrounds a region in which the third measurement electrode is arranged or, preferably, the third and the fourth measurement electrode are arranged.

It is particularly advantageous if the three measurement electrodes are arranged on the end face. Simulations have shown that it is advantageous for a conventional magnet system consisting of coil core, coil, and return body, in which the coil core extends directly to the front end, if, in addition to the two conventional measurement electrodes, one or two additional measurement electrodes are attached to the front end, especially, on the circular area defined by the two measurement electrodes.

Ideally, to the positioning of the first and second measurement electrodes applies that $R_{12}/R_f \geq 0.8$ and preferably $R_{12}/R_f \geq 0.9$ is satisfied, wherein $R_f$ is the radius of the front face to the center point, wherein the front face is usually circular and wherein $R_{12}$ describes the distance of the first and second measurement electrodes from the center point.

One embodiment provides that the first and second measurement electrodes are arranged on a straight line running on the end face, wherein the third and the fourth measurement electrode are intersected by the straight line, wherein the third and the fourth measurement electrode are arranged between the first and the second measurement electrode.

It has surprisingly been shown that, in order to fulfill the bijective relationship between the two measurement values, it is already sufficient if two additional measurement electrodes are arranged between the conventional two measurement electrodes, wherein all four measurement electrodes lie substantially on a straight line.

By arranging all the measurement electrodes on a straight line, a maximum signal strength can be achieved for both measurement electrode pairs. Furthermore, a bidirectional use of the flow meter in the pipeline is maintained for this embodiment.

One embodiment provides that the measurement electrodes lie on circumferences of concentric circles, wherein the first and the second measurement electrode lie on one of the circumferences with a radius $R_{12}$, wherein the third and the fourth measurement electrode lie on one of the circumferences with a radius $R_{34}$, wherein a ratio of the two radii satisfies the inequality of $0.2 \leq R_{34}/R_{12} \leq 0.9$, especially $0.3 \leq R_{34}/R_{12} \leq 0.7$ and preferably $0.4 \leq R_{34}/R_{12} \leq 0.6$.

It is particularly advantageous if the aforementioned limits for the ratio of the two radii are maintained in the arrangement of the measurement electrodes. When the third and fourth measurement electrodes satisfy the condition, the induced measurement voltage is Reynolds number-dependent or the correction factor $f$ (Re) has a particularly large Reynolds number dependence so that even small changes in the Reynolds number of the medium can be detected.

One embodiment provides that current measurement values of the first measurement variable during the test measurement in a Reynolds number range of $10,000 \leq Re \leq 100,000$ are substantially proportional to the flow rate of the medium, wherein a change in current measurement values of the second measurement variable is not constant as the Reynolds number increases during the test measurement in a Reynolds number range of $10,000 \leq Re \leq 100,000$.

In the case of Reynolds numbers less than 1,000, the flow is in a transition region between turbulent and laminar flow and $f(Re)$ can no longer be described by a defined function. $f(Re)$ exhibits hysteresis behavior or varies over time. In the case of large Reynolds numbers, the flow profile is Reynolds number-independent and $f(Re)$ is thus constant for both measurement variables. In this case, the Reynolds number cannot be determined.

One embodiment provides that, during the test measurement, the flowing medium is a Newtonian fluid, especially, water, wherein, during the test measurement, the flow meter is introduced in a pipeline with a straight inlet section of at least 20 DN, and preferably at least 50 DN, such that a substantially symmetrical flow profile is present in the medium, wherein the pipeline has a diameter DN of DN 80, wherein a distance between the end face and an inner wall of the pipeline describes the installation depth D, wherein the installation depth satisfies $0.05 \leq D/DN \leq 0.4$ and preferably $0.1 \leq D/DN \leq 0.2$.

The test measurement describes a measuring environment in which the condition for determining the Reynolds number, namely the bijectivity of the mapping of the quotient of the two measurement variables to the Reynolds number, is fulfilled.

One embodiment provides the method steps of:
  forming a reference value from the measurement values of the first and the second measurement variable, wherein the reference value is proportional to the quotient of the measurement values of the first and the second measurement variable; and
  determining a Reynolds number as a function of the reference value.

It is particularly advantageous if the Reynolds number is determined and output to the user. As a result, it can be checked easily whether the measuring accuracy specified by the manufacturer still applies, or whether the present Reynolds number is outside the range of application.

One embodiment provides the method steps of:
  forming a corrected flow rate and/or a corrected volumetric flow by means of a correction factor dependent on the Reynolds number; and/or
  determining the kinematic viscosity value of the medium in the pipe by means of measurement values of the first or the second measurement variable and the determined Reynolds number.

It is particularly advantageous if correction factors which serve to determine the flow rate and/or the volumetric flow more accurately, especially, one of the two correction factors $f_1$ and $f_2$, are stored in the memory unit. The correction factors can be determined in a simulation method, or determined or measured in the calibration method.

By means of the correction factors, Reynolds number-related deviations of the flow measurement value can be reduced so that the Reynolds number range in which the specified measuring accuracy is fulfilled is increased.

One embodiment provides that a function which assigns Reynolds numbers to quotients of the first and the second measurement variable is bijective at least in a Reynolds number range of $10,000 \leq Re \leq 100,000$, especially $5,000 \leq Re \leq 500,000$, and preferably $1,000 \leq Re \leq 1,000,000$.

The measurement values are output, for example, via a display connected to the flow meter. Alternatively, the display may also be part of a smartphone or laptop and receive the measurement values to be displayed from the evaluation circuit via a wireless connection. Alternative output units known in process automation are systems for data transmission, such as field buses or real-time Ethernet.

BRIEF DESCRIPTION OF THE DRAWINGS

The invention is explained in greater detail with reference to the following figures. The following are shown.

DETAILED DESCRIPTION

Figure 1:
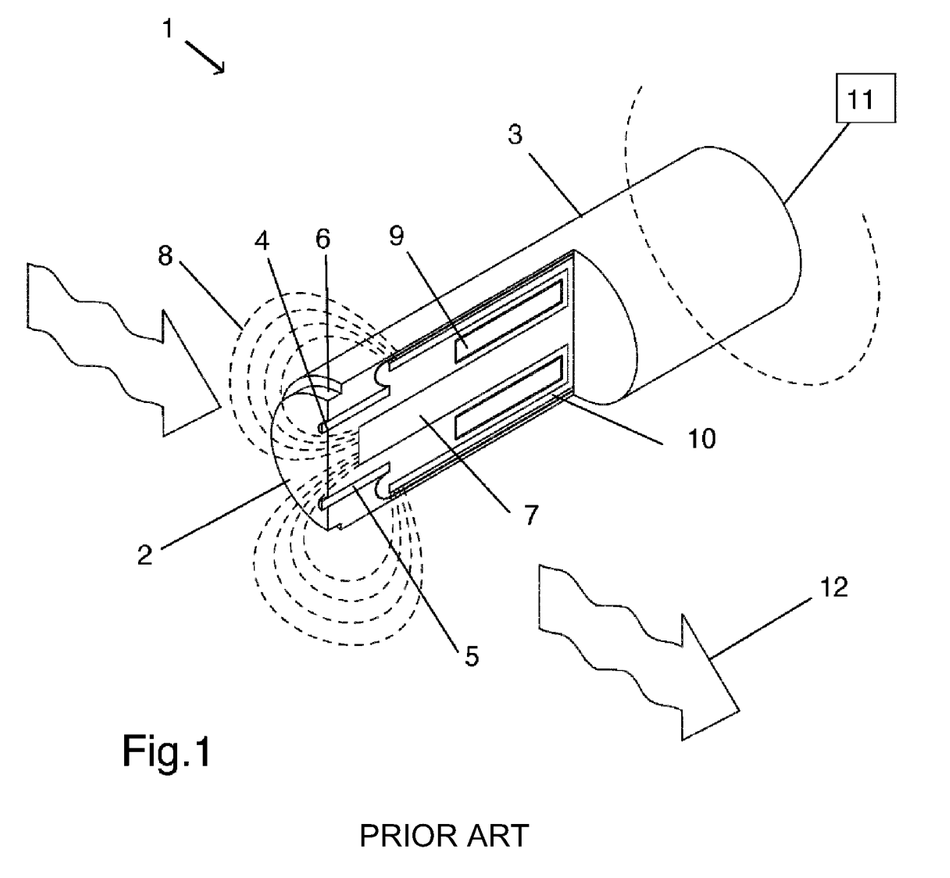
FIG. 1 shows a perspective and partially sectional illustration of a magnetic-inductive flow meter according to the prior art.
Figure 2:
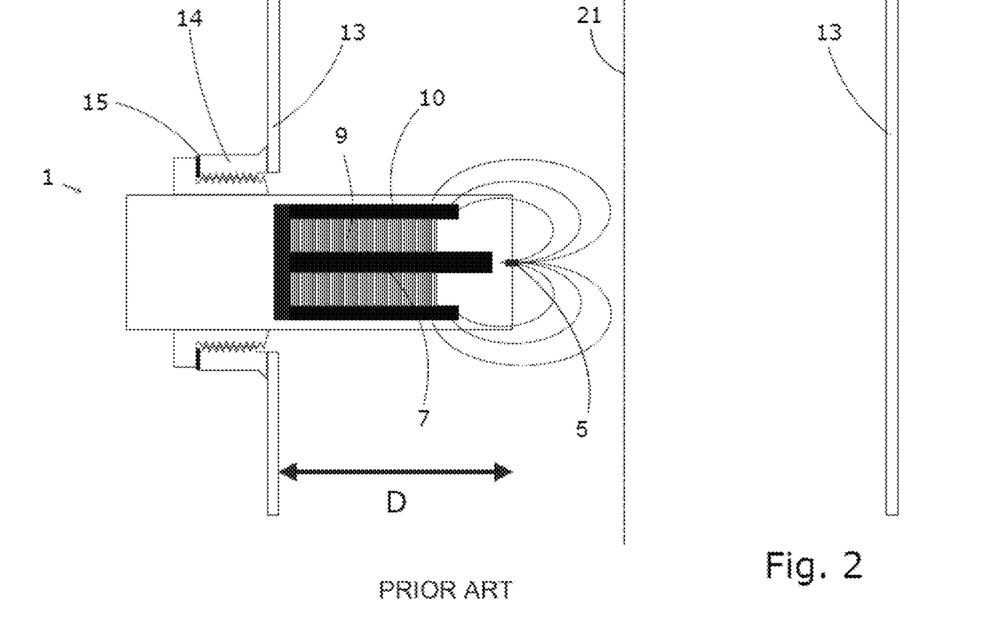
FIG. 2 shows a longitudinal sectional view of a magnetic-inductive flow meter according to the prior art installed in a pipeline.

The measuring principle on which the invention is based is first explained on the basis of the perspective and partially sectional illustration of FIG. 1. A flow meter 1 comprises a generally circular cylindrical housing 3 having a predetermined outer diameter. Said housing is adapted to the diameter of a bore, which is situated in a wall of a pipeline 13 that is not shown in FIG. 1 but is shown in FIG. 2, and into which the flow meter 1 is inserted in a fluid-tight manner. A medium to be measured flows in the pipeline 13 and the flow meter 1 is immersed into said medium essentially perpendicularly to the direction of flow of the medium, which is indicated by the wavy arrows 12. A front end 2 of the housing 3 that projects into the medium is sealed in a fluid-tight manner with a front part 6 made of insulating material. By means of a coil arrangement 9 arranged in the housing 2, a magnetic field 8 can be generated, which extends through the front end into the medium. A coil core 7, which is at least partially made of a soft magnetic material and is arranged in the housing 2, terminates at or near the front end. A return 10 that surrounds the coil arrangement 9 and the coil core 7 is configured to return, into the housing 2, the magnetic field 8 extending through from the front end. The coil core 7, the coil arrangement 9 and a return 10 form a magnetic field-generating device. A first and a second galvanic measurement electrode 4, 5 are arranged in the front part 6 and contact the medium. An electrical voltage induced on the basis of Faraday's law of induction can be tapped at the measurement electrodes 4, 5 by means of a measurement and/or evaluation unit 11. This is at a maximum if the flow meter is installed in the pipeline 13 such that a plane spanned by a straight line intersecting the two measurement electrodes 4, 5 and by a longitudinal axis of the flow meter runs in a manner perpendicular to the direction of flow 12 or to the longitudinal axis of the pipeline 21.

FIG. 2 shows a longitudinal section of a flow meter 1 installed in a pipeline. The flow meter 1 is fastened in the pipeline 13 in a fluid-tight manner by means of a screw-in connection 14, which is inserted into the wall of the pipeline 13 and is welded thereto, for example. This structure of the measuring point is particularly suitable since the screw-in connection 14 can initially be inserted into the pipeline 13 and welded therein and only then does the flow meter 1 have to be inserted into the screw-in connection 14, in turn screwed therein, and sealed by means of a seal 15. This results in an unknown installation angle due to the installation. The first, second, third and fourth measurement electrodes 4, 5, 19, 20 are arranged on the front end 2 symmetrically to a center 16 of the front end 2. All four measurement electrodes 4, 5, 19, 20 lie on a straight line. The installation depth D indicates how deep the flow meter is inserted into the medium or projects into the pipe.

FIGS. 3 to 7 show different embodiments of the magnetic-inductive flow meter according to the invention. The embodiments differ in that the positioning of the measurement electrodes varies. In order to ensure the clarity of the figures, the illustration of the magnetic field-generating device is omitted. FIGS. 1 and 2 each disclose a magnet system that discloses a coil, a coil core, and a return body. However, other magnetic field-generating devices that are installed in magnetic-inductive flow meters are also known. The exact arrangement of the measurement electrodes depends upon the geometry and arrangement of the magnetic field-generating device. This must therefore be taken into account when optimizing the ideal arrangement of the measurement electrodes.

Figure 3:
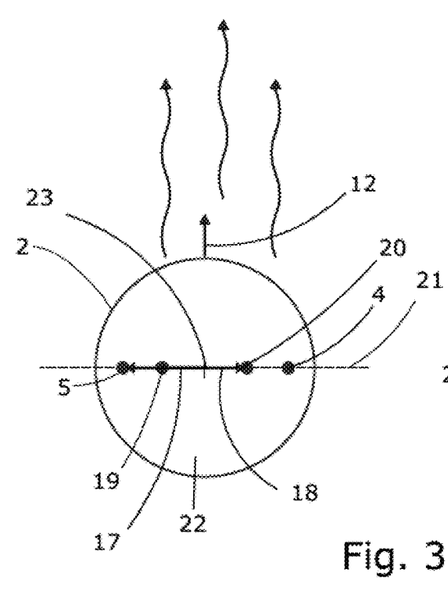
FIG. 3 shows a front view of a first embodiment of the magnetic-inductive flow meter according to the present disclosure.

FIG. 3 shows a schematic front view of a first exemplary embodiment of the flow meter according to the invention. An arrow indicates the direction of flow 12 of the flowing medium. The ideal installation orientation requires a straight reference line 21 intersecting the measurement electrode pair to run perpendicularly to the direction of flow 12 of the medium. The first and the second measurement electrode 4, 5 are arranged, lying on the front face 22, on the straight reference line 21, and their positioning is adapted to the magnetic field-generating device such that the induced measurement voltage applied to the two measurement electrodes 4, 5 is linear over the specified Reynolds number range. In addition to the first and second measurement electrodes 4, 5, a third and fourth measurement electrode 19, 20 are arranged on the front face 22. The third and fourth measurement electrodes 19, 20 also lie on the straight reference line 21 and are arranged between the first and second measurement electrodes 4, 5. The first and second measurement electrodes 4, 5 lie on a circumference with radius $R_{12}$ and the third and fourth measurement electrodes 19, 20 lie on a circumference with radius $R_{34}$. According to this embodiment, $R_{34} < R_{12}$.

The measurement circuit is designed in such a way that it taps a first potential difference $U_1$ between the first and the second measurement electrode 4, 5 and a second potential difference $U_2$ between the third and fourth measurement electrodes 19, 20, where $U_1 = f_1(\text{Re}) \cdot S_1 \cdot u$ and $U_2 = f_2(\text{Re}) \cdot S_2 \cdot u$, wherein $f_1(\text{Re})$ and $f_2(\text{Re})$ each describe a Reynolds number-dependent correction factor. The positioning of the third and fourth measurement electrodes 19, 20 is optimized in such a way that the quotient of the first and second potential differences $U_1/U_2$ behaves bijectively to the Reynolds number of the flowing medium in the pipe or that a mathematical function which is dependent on the first and second potential differences and which maps the Reynolds number onto the quotient is bijective. The arrangement can be optimized experimentally or by means of a simulation method, for example, by means of finite element simulations.

For the quotient $U_1/U_2$ the following results:

$$\frac{U_1}{U_2} = \frac{f_1(\text{Re})}{f_2(\text{Re})} \cdot \frac{S_1}{S_2} = g(\text{Re}) \cdot \frac{S_1}{S_2}.$$

In the case that gRe is invertible, $$Re = g^{-1}\left(U_1 \cdot \frac{S_2}{S_1 \cdot U_2}\right)$$

also applies, wherein $g^{-1}$ is the inverse function of g. The bijectivity of the quotient can most easily be realized in that the first and the second measurement electrode are attached in the housing such that the first correction factor $f_1(Re)$ is independent of the Reynolds number over the Reynolds number range. In this case, the second correction factor $f_2$ must bijectively correspond to the Reynolds number.

The measurement circuit is configured to tap a potential difference between the first and the second measurement electrode 4, 5 and a potential difference at the third and fourth measurement electrodes 19, 20 or to measure a potential in relation to a reference potential at the respective measurement electrode. The measurement data are forwarded to an evaluation unit which comprises a memory unit in which reference values and Reynolds numbers are stored. An evaluation circuit is configured to determine the Reynolds number of the medium in the pipe from the measured measurement data and the stored reference data. If the Reynolds number is known, the kinematic viscosity can be calculated using the measurement values of the first or the second measurement variable or of the already determined flow rate or of the volumetric flow. The measurement circuit, evaluation circuit, and the memory unit can be arranged on an electronic unit in a different way than is depicted in the schematic illustration.

According to the first embodiment, the measurement electrodes at which an optimally Reynolds number-independent measurement voltage is tapped lie on a circumference which surrounds a region in which the two measurement electrodes, at which a Reynolds number-dependent measurement voltage is tapped, are arranged. However, with an adaptation of the magnet system, the measurement voltage applied to the internal measurement electrodes can also be linearly correlated with the flow rate and the measurement voltage applied to the external measurement electrodes can be Reynolds number-dependent. According to the invention, it must only be fulfilled that the quotient of the two induced and measured measurement voltages must be bijective over a defined Reynolds number range.

Figure 4:
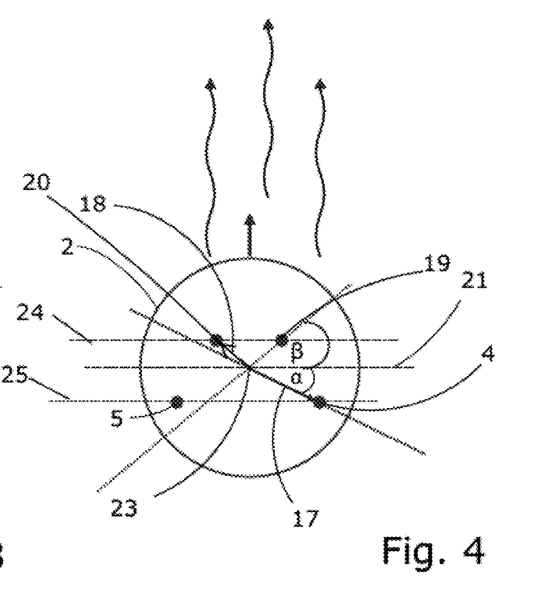
FIG. 4 shows a front view of a second embodiment of the magnetic-inductive flow meter according to the present disclosure.

FIG. 4 shows a front view of a second embodiment of the magnetic-inductive flow meter according to the invention. In this embodiment, four measurement electrodes 4, 5, 19, 20 are arranged on the front end 2 of the flow meter. A first measurement electrode axis 24 intersects the second measurement electrode pair 19, 20, and a second measurement electrode axis 25 intersects the first measurement electrode pair 4, 5. The two measurement electrode axes 24, 25 run substantially in parallel to each other. The straight reference line 21, which divides the front face into two equally large faces and runs in parallel to the first or second measurement electrode axis 24, 25, runs through the center point 23 of the front end 2. One of the two measurement electrodes 19, 20 forming the second measurement electrode pair and the center point 23 are intersected by a second radius 18. One of the two measurement electrodes 19, 20 forming the second measurement electrode pair and the center point 23 of the front face 2 are intersected by a first straight line such that the straight reference line 21 and the first straight line span an angle β. A second straight line, which intersects the center point 23 and one of the two measurement electrodes 4, 5 forming the first measurement electrode pair at a first radius 17, spans an angle α together with the straight reference line 21. If the angles are selected such that α=β=0° applies, one arrives at the first embodiment. Starting from the magnet system, the angles α and β can be optimized such that a Reynolds number-independent measurement voltage is induced at one measurement electrode pair and a Reynolds number-dependent measurement voltage is induced at the other measurement electrode pair, wherein the respective dependence applies to a limited Reynolds number range. The straight reference line 21 is additionally also oriented perpendicularly to the direction of flow of the medium. The flow meter is installed in the pipe such that the direction of flow of the medium runs perpendicularly to the straight reference line 21.

Figure 5:
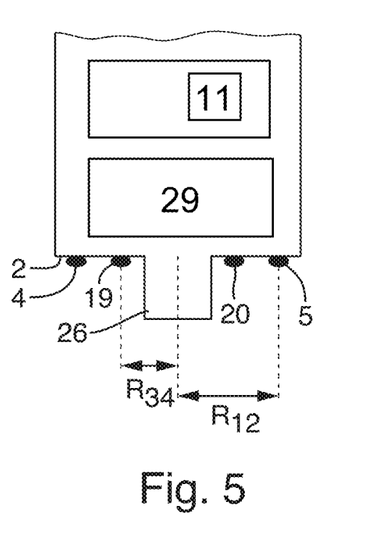
FIG. 5 shows a longitudinal sectional view of the first embodiment of the magnetic-inductive flow meter according to the present disclosure with an additional paddle.

FIG. 5 shows a longitudinal sectional view of a modification of the first embodiment of the flow meter according to the invention. In contrast to FIG. 1, the front end 2 has a paddle 26. The front end 2 is thus not formed by a single front face but by several front faces which are partially perpendicular to one another or run in parallel. This also means that the measurement electrodes can be arranged on the side faces or on the front face of the paddle 26. According to the first embodiment, however, the measurement electrodes are not attached to the paddle 26. The measurement electrodes 4, 5, 19, 20 are located in the region between the paddle 26 and the edge region of the front end 2. The first and second measurement electrodes 4, 5 each have a distance $R_{12}$ from the center point of the front end. The position of the two measurement electrodes 4, 5 is optimized in such a way that the correction factor for determining the flow rate is independent of the Reynolds number. The center point of the front end lies on a longitudinal plane of the flow meter, which is also simultaneously a mirror plane. The third and fourth measurement electrodes 19, 20 lie on the perimeter of a circumference with radius $R_{34}$ to the center point. The position of the two measurement electrodes 19, 20 is optimized in such a way that the correction factor for determining the flow rate depends on the Reynolds number. To the embodiment depicted in FIG. 5, $R_{34} < R_{12}$ applies.

Figure 6:
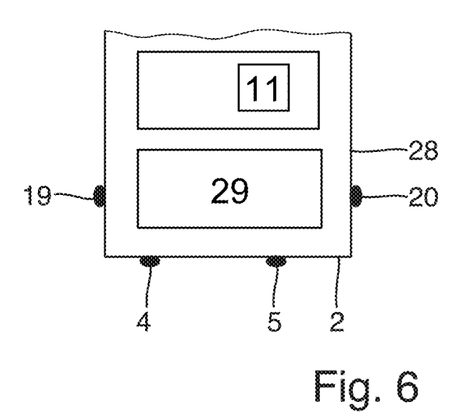
FIG. 6 shows a longitudinal sectional view of a third embodiment of the magnetic-inductive flow meter according to the present disclosure.

FIG. 6 shows a longitudinal sectional view of a second embodiment, in which the third and fourth measurement electrodes 19, 20 are arranged on the lateral surface (28) of the housing and the first and second measurement electrodes 4, 5 are arranged on the front end 2. In this embodiment, the arrangement of the measurement electrodes 4, 5 arranged on the front face is adapted to the magnetic field-generating device in such a way that the flow measurement value correlates linearly with the determined measurement voltage over as large a Reynolds number range as possible. The positioning of the measurement electrodes 19, 20 arranged on the sheath in correlation with the magnet system is selected such that the measurement voltage induced on the two measurement electrodes is Reynolds number-dependent over as large a Reynolds number range as possible. The optimization of these two measurement electrodes 19, 20 takes place such that the slope of the correction factor $f(Re)$ becomes as large as possible with a varying Reynolds number.

Magnetic-inductive flow meters are known in the prior art which have measurement electrodes which are attached exclusively to the lateral surface (28) of the housing. Accordingly, the magnetic field-generating device is also adapted such that the induced measurement voltage correlates linearly with the flow rate. Starting from such flow meters, the arrangement of the first and second measurement electrodes (4, 5) is selected depending on the magnet system such that the induced measurement voltage is Reynolds number-dependent over as large a Reynolds number range as possible, or that the gradient of the correction factor is as large as possible as the Reynolds number increases.

Figure 7:
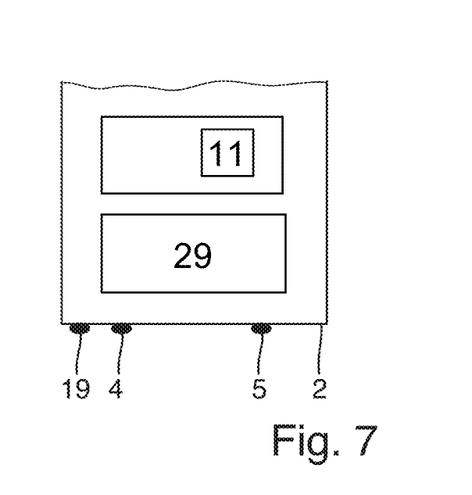
FIG. 7 shows a longitudinal sectional view of a fourth embodiment of the magnetic-inductive flow meter according to the present disclosure.

FIG. 7 shows a longitudinal section of a fourth embodiment. In addition to the first and second measurement electrodes 4, 5, which are both arranged on the front end 2, a third measurement electrode 19 is also positioned on the front face. The distance between the first and second measurement electrodes 4, 5 defines the diameter of a circle. The third measurement electrode 19 is located outside the circular area. According to the fourth embodiment, the measurement circuit is configured such that a measurement voltage at the first and second measurement electrodes 4, 5 and an electrical potential at the third measurement electrode 19 in relation to a ground potential or a measurement voltage between the third and the first or second measurement electrodes 19, 4 or 19, 5, respectively, are tapped.

It applies to all embodiments that the positioning of the measurement electrodes in relation to the magnetic field-generating device must be selected such that a first measurement variable, which is Reynolds number-independent over a Reynolds number range, and a second measurement variable, which is Reynolds number-dependent over the same Reynolds number range, can be determined. It must especially be true that the quotient of the two measurement variables describes a bijective mathematical function for different Reynolds numbers.

Figure 8:
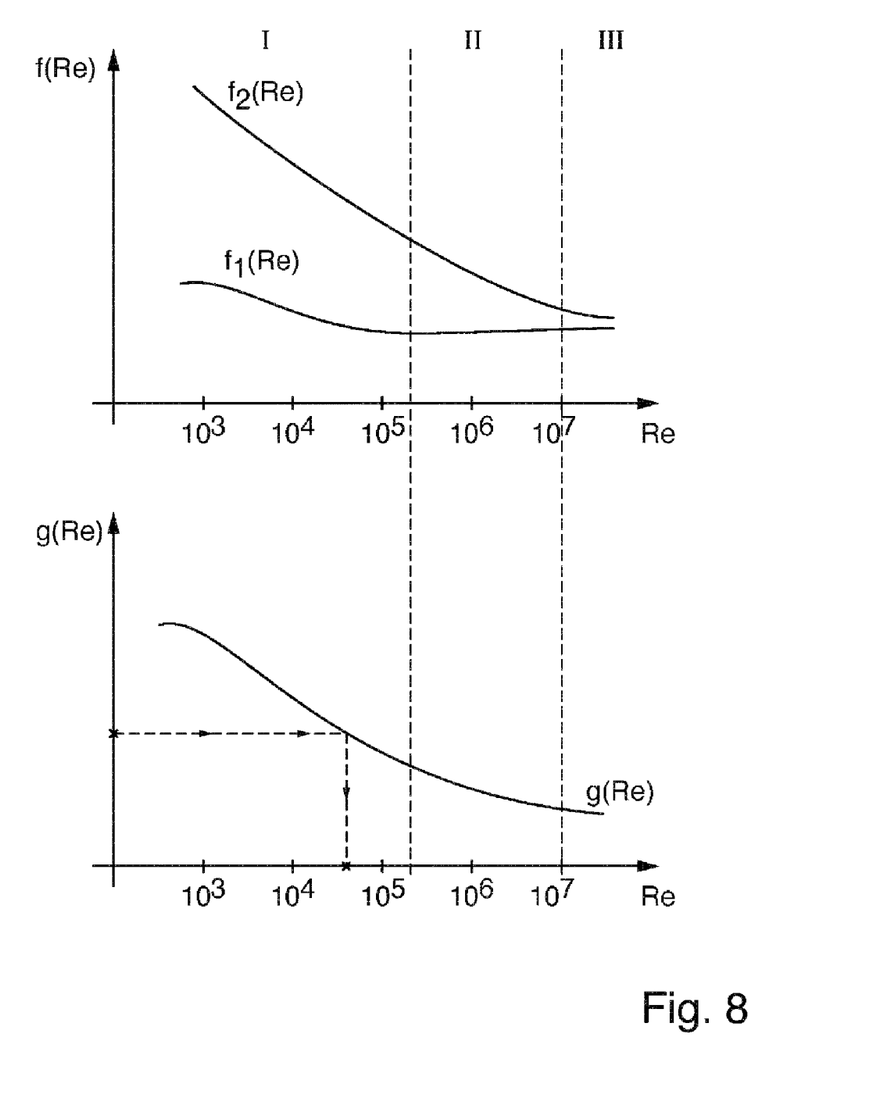
FIG. 8 shows two diagrams, wherein the first diagram depicts the functions $f_1$ (Re) and $f_2$ (Re) as a function of the Reynolds number, and the second diagram depicts the quotient g of the two functions $f_1$ (Re) and $f_2$ (Re) as a function of the Reynolds number.

FIG. 8 shows two diagrams, wherein the first diagram shows a relationship between the individual correction factors $f_1, f_2$ and the Reynolds number of the flowing medium in the pipe, and the second diagram shows a relationship between the quotients of the correction factors g and the Reynolds number of the flowing medium in the pipe. The two diagrams are limited to a Reynolds number range of approximately $10^3$ to $10^7$. The correction factors $f_1$ and $f_2$ are each linked to one of the two potential differences tapped by different measurement electrode pairs. The curve of the functions $f_1$ and $f_2$ has three ranges I, II, III. In the first and third ranges I, III, the curve of $f_1$ is not constant. In this example, the curve has a negative slope in the first range I and a positive slope in the third range III. In contrast, the curve of $f_1$ is constant in the second range II. The flow meter is linear for this Reynolds number range. The second function $f_2$ is bijective at least in the second range. In the example shown, the curve of $f_2$ is also bijective in the first and third ranges I, III. This results in the quotient g being bijective in the ranges one to three I, II, III. A Reynolds number can thus be clearly assigned to each quotient of the measurement data of the two measurement variables. This means that if a value of g can be determined, the corresponding Reynolds number can be derived. For the ranges in which the flow rate is sensitive to Reynolds number changes, see ranges I and III, measuring deviations can be corrected taking into account the Reynolds number-dependent correction function.

Figure 9:
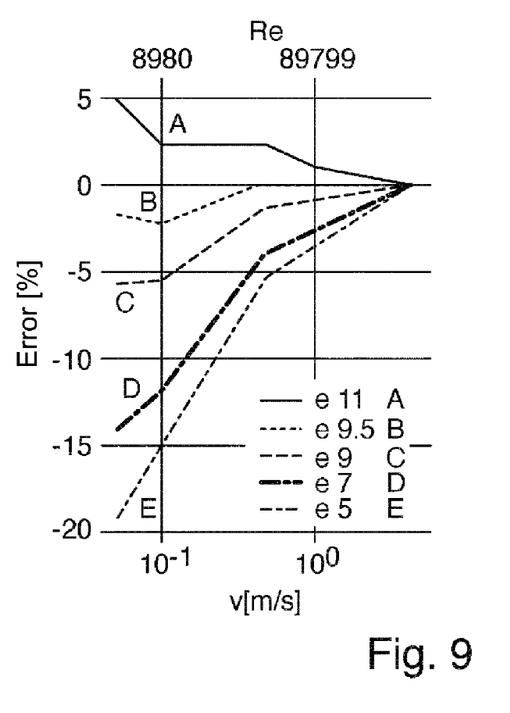
FIG. 9 shows a diagram showing the error as a function of the flow rate of the medium for various electrode arrangements.

FIG. 9 shows a diagram describing the influence of the position of the measurement electrodes on the front end on the Reynolds number dependence of the induced measurement voltage. The diagram maps the Reynolds number-related measurement error onto the flow rate. The Reynolds number depends on the flow rate. Five different measurement electrode positions (5; 7; 9; 9.5; and 11 millimeters of distance from the center point) were measured and the deviation from the actual flow value was determined (curves A-E). The value after the symbol "e" indicates the radius of an imaginary circumference in millimeters on which the measurement electrodes are located. It can be seen from the measurement data that, at a distance of 9.5 mm, the deviation of the flow measurement value over the entire depicted Reynolds number range is substantially independent of the Reynolds number, or that the error is always less than 2.5% (see dotted curve B). However, if the measurement electrodes are arranged on a circumference with a radius of 5 mm, a correction factor independent of the Reynolds number can no longer be assumed. Measurement deviations of up to 20% are present (see curve E). With the aid of a flow meter that has a measurement electrode pair which lies on a circumference with 9.5 mm and that has an additional measurement electrode pair which lies on a circumference with a radius of 5 mm, the Reynolds number can now be determined or a Reynolds number-dependent correction of one of the two measurement voltages can now be carried out, taking into account the measurement voltage applied to each of the measurement electrode pairs.

Figure 10:
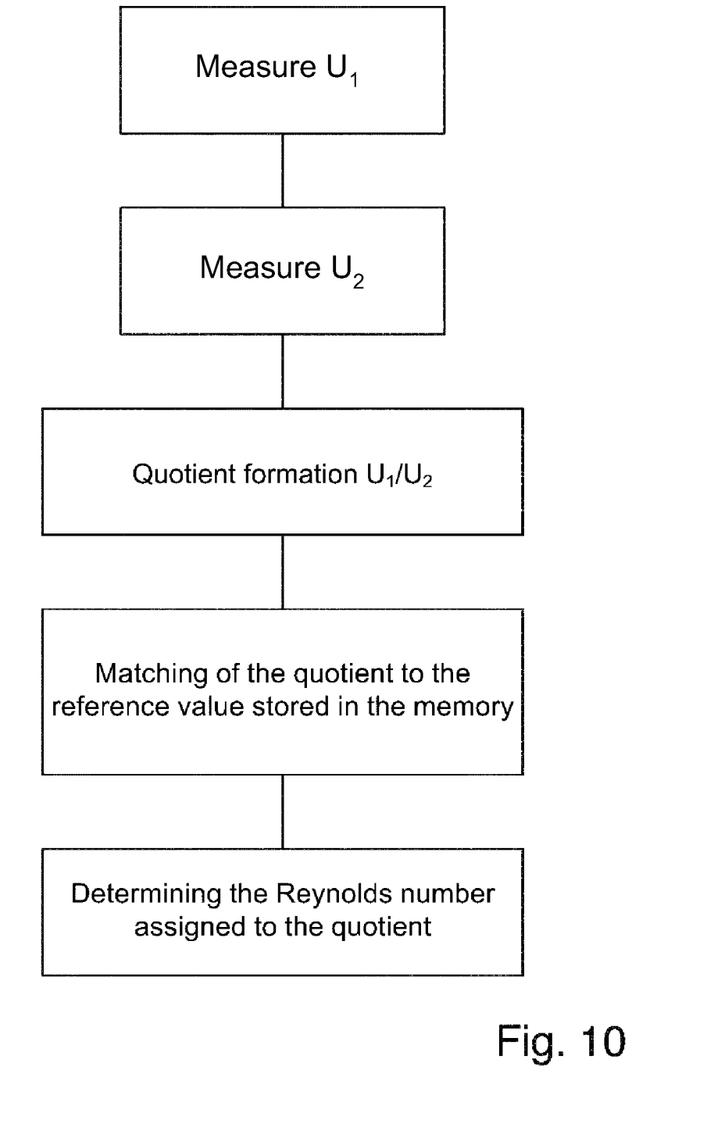
FIG. 10 shows a flow chart of an embodiment of the method for operating a magnetic-inductive flow meter.

FIG. 10 shows a flow diagram of an embodiment of the method for operating a magnetic-inductive flow meter. In a first step, the first potential difference $U_1$ is measured at the first measurement electrode pair. In a second step, the second potential difference $U_2$ is measured at the second measurement electrode pair. As an alternative to measuring the potential difference, the potentials at the respective measurement electrodes in relation to the reference potential can also be measured in both aforementioned steps, and the difference can be formed, for example, in the evaluation circuit. The two first steps do not have to take place in succession but can also take place simultaneously. The second potential difference $U_2$ may also be measured first and then the first potential difference $U_1$. However, measurement voltages of two measuring phases, in which different, especially, opposite, DC voltages are applied to each of the coils and in which the magnetic field has been adjusted, are usually taken into account for determining the flow rate or the volumetric flow. An offset at the zero point can thereby be compensated. The measurement of the potential difference or of the potentials takes place via a measurement circuit. The evaluation circuit forms a quotient of the two measured measurement values, especially, potential differences, and compares this quotient with a Reynolds number assigned to this determined quotient. The Reynolds number is stored in a memory. Alternatively, a mathematical equation or a mathematical function which assigns a Reynolds number or a Reynolds number range to a quotient may also be stored in the memory. Alternatively, data that have been determined in a calibration method may also be stored in the memory. The data can be the reference values measured in the calibration method but also interpolated or extrapolated values or values of, for example, a smoothed characteristic curve or fit function of the measurement data. The reference values can be determined in a calibration method experimentally and/or by means of a simulation program.

The invention claimed is:

1. A magnetic-inductive flow meter, which is configured to be introduced into a pipe adapted to convey a flowing medium, comprising:
    a housing, wherein the housing includes a housing wall;
    a first measurement electrode, a second measurement electrode and at least a third measurement electrode, which are each arranged on the housing wall such that each forms a galvanic contact with the medium when introduced into the pipe;

a magnetic field-generating device configured to generate a magnetic field passing through the housing wall, wherein the magnetic field-generating device is disposed in the housing; and a measurement circuit configured to determine at least a first measurement variable, wherein measurement values of the first measurement variable are measured between two of the first, second and third measurement electrodes or at one of the first, second and third measurement electrodes in relation to a reference potential; and an evaluation circuit configured to determine a Reynolds number and/or a kinematic viscosity value of the medium in the pipe using measurement values of the first measurement variable and a second measurement variable, which differs from the first measurement variable, wherein measurement values of the second measurement variable are determined between two of the first, second and third measurement electrodes or at one of the first, second and third measurement electrodes in relation to a reference potential, wherein at least one measurement electrode of the first, second and third measurement electrodes used to determine the measurement values of the second measurement variable differs from the measurement electrodes used to determine the measurement values of the first measurement variable.

2. The flow meter of claim 1, wherein the first, second and third measurement electrodes are arranged on the housing wall such that, during a test measurement, quotients of current measurement values of the first and second measurement variable bijectively correspond to the Reynolds number of the medium in the pipe, at least in a Reynolds number range of $1{,}000 \leq Re \leq 1{,}000{,}000$.

3. The flow meter of claim 2, wherein current measurement values of the first measurement variable during the test measurement in a Reynolds number range of $10{,}000 \leq Re \leq 100{,}000$ are substantially proportional to the flow rate of the medium, wherein a change in current measurement values of the second measurement variable is not constant as the Reynolds number increases during the test measurement in a Reynolds number range of $10{,}000 \leq Re \leq 100{,}000$.

4. The flow meter of claim 2, wherein, during the test measurement, the flowing medium is a Newtonian fluid, and wherein, for the test measurement, the flow meter is disposed in a pipe having a straight inlet section of at least DN 20 such that a substantially symmetrical flow profile is present in the medium, wherein the pipe otherwise has a diameter DN 80, wherein a distance between an end face of the housing and an opening of the pipe in which the flow meter is disposed defines the installation depth D, and wherein the installation depth satisfies $0.05 \leq D/DN \leq 0.4$.

5. The flow meter of claim 2, wherein the first, second and third measurement electrodes are arranged on the housing wall such that, during a test measurement, quotients of current measurement values of the first and second measurement variable bijectively correspond to the Reynolds number of the medium in the pipe, at least in a Reynolds number range of $10{,}000 \leq Re \leq 100{,}000$.

6. The flow meter of claim 1, wherein the measurement circuit is configured to determine the measurement values of the first measurement variable between the first and the second measurement electrodes, and wherein the measurement circuit is configured to determine measurement values of the second measurement variable between the first and third measurement electrodes or between the second and third measurement electrodes.

7. The flow meter of claim 1, further comprising a fourth measurement electrode, wherein the measurement circuit is configured to determine the measurement values of the first measurement variable between the first and second measurement electrodes, and wherein the measurement circuit is configured to determine measurement values of the second measurement variable between the third and fourth measurement electrodes.

8. The flow meter of claim 1, wherein the housing is cylindrical at least in sections and includes a lateral surface, and wherein the third measurement electrode is disposed on the lateral surface as to form a galvanic contact with the medium in operation.

9. The flow meter of claim 1, wherein the first, second and third measurement electrodes are disposed on an end face of the housing.

10. The flow meter of claim 9, wherein the first and second measurement electrodes lie on a first circumference on the end face and are arranged coaxially to the housing, wherein the first circumference defines an area in which the third measurement electrode is disposed.

11. The flow meter of claim 10, further comprising a fourth measurement electrode, wherein both the third and the fourth measurement electrodes are disposed within the defined area.

12. The flow meter of claim 10, further comprising a fourth measurement electrode, wherein the first and second measurement electrodes are arranged on a straight line on the end face, and wherein the third and fourth measurement electrodes are arranged on the straight line between the first and second measurement electrodes.

13. The flow meter of claim 10, further comprising a fourth measurement electrode, wherein the first, second, third and fourth measurement electrodes lie on circumferences of concentric circles, wherein the first and second measurement electrodes lie on the first circumference having a first radius $R_{12}$, wherein the third and fourth measurement electrodes lie on a second circumference having a second radius $R_{34}$, and wherein a ratio of the first and second radii satisfies $0.2 \leq R_{34}/R_{12} \leq 0.9$.

14. The flow meter of claim 13, wherein the ratio of the first and second radii satisfies $0.4 \leq R_{34}/R_{12} \leq 0.6$.

15. The flow meter of claim 9, further comprising a fourth measurement electrode, wherein the first and second measurement electrodes are arranged on a straight line on the end face, and wherein the third and fourth measurement electrodes are arranged on the straight line between the first and second measurement electrodes.

16. The flow meter of claim 1, wherein to the reference potential is a ground potential.

17. A method for operating the magnetic-inductive flow meter according to claim 16, the method comprising:

detecting a measurement value of the first measurement variable and a measurement value of the second measurement variable that differs from the first measurement variable, wherein the measurement values of the respective measurement variables are determined between two of the first, second and third measurement electrodes or at one of the first, second and third measurement electrodes in relation to a reference potential; and determining a Reynolds number that depends on the first and the second measurement variable.

18. The method of claim 17, further comprising:

defining a reference value from the measurement values of the first and the second measurement variable, wherein the reference value is proportional to the quotient of the measurement values of the first and the second measurement variable; and determining the Reynolds number as a function of the reference value.

19. The method of claim 18, further comprising:

defining a corrected flow rate and/or a corrected volumetric flow using a correction factor dependent on the Reynolds number; and/or determining the kinematic viscosity value of the medium in the pipe using the measurement values of the first or second measurement variable and the determined Reynolds number.

20. The method of claim 17, further comprising:

defining a corrected flow rate and/or a corrected volumetric flow using a correction factor dependent on the Reynolds number; and/or determining the kinematic viscosity value of the medium in the pipe using the measurement values of the first or second measurement variable and the determined Reynolds number.

21. A flow measuring point, comprising:

a pipe having a diameter DN and an opening; and a magnetic-inductive flow meter according to claim 1, wherein the magnetic-inductive flow meter is disposed in the opening at an installation depth D, which satisfies $0.05 \leq D/DN \leq 0.4$.

* * * * *